United States Patent
Pawar

(12) 
(10) Patent No.: US 9,899,810 B2
(45) Date of Patent: Feb. 20, 2018

(54) SWITCHGEAR ENCLOSURE WITH IMPROVED VENTING

(71) Applicant: ABB Technology AG, Zurich (CH)

(72) Inventor: Rahul Pawar, Lake Mary, FL (US)

(73) Assignee: ABB SCHWEIZ AG, Baden (CH)

( * ) Notice: Subject to any disclaimer, the term of this patent is extended or adjusted under 35 U.S.C. 154(b) by 281 days.

(21) Appl. No.: 14/949,917

(22) Filed: Nov. 24, 2015

(65) Prior Publication Data

US 2017/0149217 A1 May 25, 2017

(51) Int. Cl.
| | |
|---|---|
| H02B 1/56 | (2006.01) |
| G06F 1/20 | (2006.01) |
| H05K 5/00 | (2006.01) |
| H05K 7/20 | (2006.01) |
| H02B 13/025 | (2006.01) |

(52) U.S. Cl.
CPC ........... *H02B 1/565* (2013.01); *H02B 13/025* (2013.01)

(58) Field of Classification Search
CPC ... H02B 1/56; H02B 1/26; H02B 1/38; H02B 1/20; H02B 11/00; H02B 1/48; H02B 1/565; H01H 9/342; H01H 9/52; H01H 71/02; H05K 5/0213; H05K 5/00; H05K 7/20145; H05K 7/20781; H05K 7/20581; H05K 7/1492; G06F 1/20; G06F 1/181; G06F 1/189
See application file for complete search history.

(56) References Cited

U.S. PATENT DOCUMENTS

| | | | | |
|---|---|---|---|---|
| 5,689,097 A | * | 11/1997 | Aufermann | H02B 1/565 218/157 |
| 6,215,654 B1 | * | 4/2001 | Wilkie, II | H02B 1/21 218/156 |
| 7,952,857 B1 | * | 5/2011 | Motley | H02B 13/025 361/678 |
| 8,785,770 B2 | * | 7/2014 | Gingrich | H02B 1/565 174/17 VA |
| 9,472,925 B2 | * | 10/2016 | Zende | H02B 13/025 |
| 2009/0159569 A1 | * | 6/2009 | Kurogi | H02B 13/01 218/157 |
| 2012/0106033 A1 | * | 5/2012 | Kasza | H02B 1/56 361/605 |
| 2014/0110232 A1 | * | 4/2014 | Gingrich | H01H 33/53 200/306 |

(Continued)

*Primary Examiner* — James Wu
*Assistant Examiner* — Michael Matey
(74) *Attorney, Agent, or Firm* — Manelli Selter PLLC; Edward J. Stemberger

(57) ABSTRACT

A switchgear enclosure includes a first circuit breaker compartment having an opening therein defining a first air outlet. A second circuit breaker compartment is adjacent to and vertically below the first circuit breaker compartment. A first door is associated with the first circuit breaker compartment and a second door is associated with the second circuit breaker compartment, with each door having an opening therein defining a door air inlet. A main bus compartment is adjacent to at least the second circuit breaker compartment and has an opening therein defining a second air outlet. An air passage fluidly connects the second circuit breaker compartment with the main bus compartment so that air entering through the door air inlet of the second door can flow into the main bus compartment via the air passage and flow out of the second air outlet.

17 Claims, 3 Drawing Sheets

(56) References Cited

U.S. PATENT DOCUMENTS

| | | | |
|---|---|---|---|
| 2014/0133071 A1* | 5/2014 | Gingrich | H02B 1/565 361/678 |
| 2016/0043532 A1* | 2/2016 | Zende | H02B 13/025 361/611 |
| 2016/0156163 A1* | 6/2016 | Faber | H02B 13/025 361/605 |
| 2016/0242315 A1* | 8/2016 | Pawar | H02B 1/56 |
| 2016/0248234 A1* | 8/2016 | Rajauria | H02B 1/30 |
| 2017/0256922 A1* | 9/2017 | Rajauria | H02B 13/005 |

* cited by examiner

SWITCHGEAR ENCLOSURE WITH IMPROVED VENTING

BACKGROUND

The present embodiment relates to an electrical switchgear and, more particularly, to an enclosure for a switchgear and a ventilation system therefor.

With reference to FIG. 1, a conventional switchgear is shown, generally indicated at 10. The switchgear includes an enclosure 12 that includes at least one circuit breaker compartment 14 housing a conventional circuit breaker 15, a main bus compartment 16 adjacent to the circuit breaker compartment 14 and a cable compartment 18 adjacent to the main bus compartment 16 and to the circuit breaker compartment 14.

Venting of the enclosure occurs as natural convective airflow occurs through openings 20 in doors 22 of the circuit breaker compartment 14 through openings 24 in the top of the circuit breaker compartment 14, through opening 24' in the top of the main bus compartment 16, and through louvered vent boxes 25. The conventional louvered flaps 27 of the vent boxes 25 however resist natural ventilation of the hot air.

It is difficult to vent and cool the buses 26 in the main bus compartment 16 since the busses 26 are aligned along a common axis X in a vertically stacked arrangement, causing hot air from the lower buses to heat up the upper buses. For example, bus 26' will receive heat from the buses 26" and 26''' and bus 26" will receive heat from bus 26'''. Furthermore, although airflow may be efficient over buses 26' and 26''', it is not efficient over middle bus 26" and hot air accumulation from the bus 26" towards the top of the main bus compartment 16 results in less efficient ventilation for the bus 26". Also, the cable compartment 18 has no vent opening to atmosphere.

Thus, there is a need to provide an improved switchgear enclosure that ensures proper ventilation of the circuit breaker compartment, a main bus compartment, and a cable compartment and to ensure efficient airflow over all buses.

SUMMARY

An objective of the present invention is to fulfill the need referred to above. In accordance with the principles of the embodiment, this objective is obtained by an enclosure for a switchgear. The enclosure includes a first circuit breaker compartment constructed and arranged to house a first circuit breaker therein. The first circuit breaker compartment has an opening therein defining a first air outlet. A second circuit breaker compartment is constructed and arranged to house a second circuit breaker therein. The second circuit breaker compartment is adjacent to and vertically below the first circuit breaker compartment. The second circuit breaker compartment has an opening therein defining a compartment air inlet. A first door is associated with the first circuit breaker compartment and a second door is associated with the second circuit breaker compartment, with each door having an opening therein defining a door air inlet. A main bus compartment is adjacent to at least the second circuit breaker compartment and is constructed and arranged to house circuit breaker buses therein. The main bus compartment has an opening therein defining a second air outlet. An air passage fluidly connects the second circuit breaker compartment with the main bus compartment. A cable compartment is adjacent to the main bus compartment and is adjacent to a portion of at least the second circuit breaker compartment. The cable compartment has an opening therein defining a third air outlet and at least one other opening therein defining a cable compartment air inlet. To ventilate the enclosure, 1) air entering through the door air inlet of the first door can flow out of the first air outlet, 2) air entering through the door air inlet of the second door and air from the cable compartment air inlet that enters the second circuit breaker compartment via the compartment air inlet, can flow into the main bus compartment via the air passage and flow out of the second air outlet, and 3) air entering the cable compartment via the cable compartment air inlet can flow out of the third air outlet.

Other objectives, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF AN EXAMPLE EMBODIMENT

Figure 1:
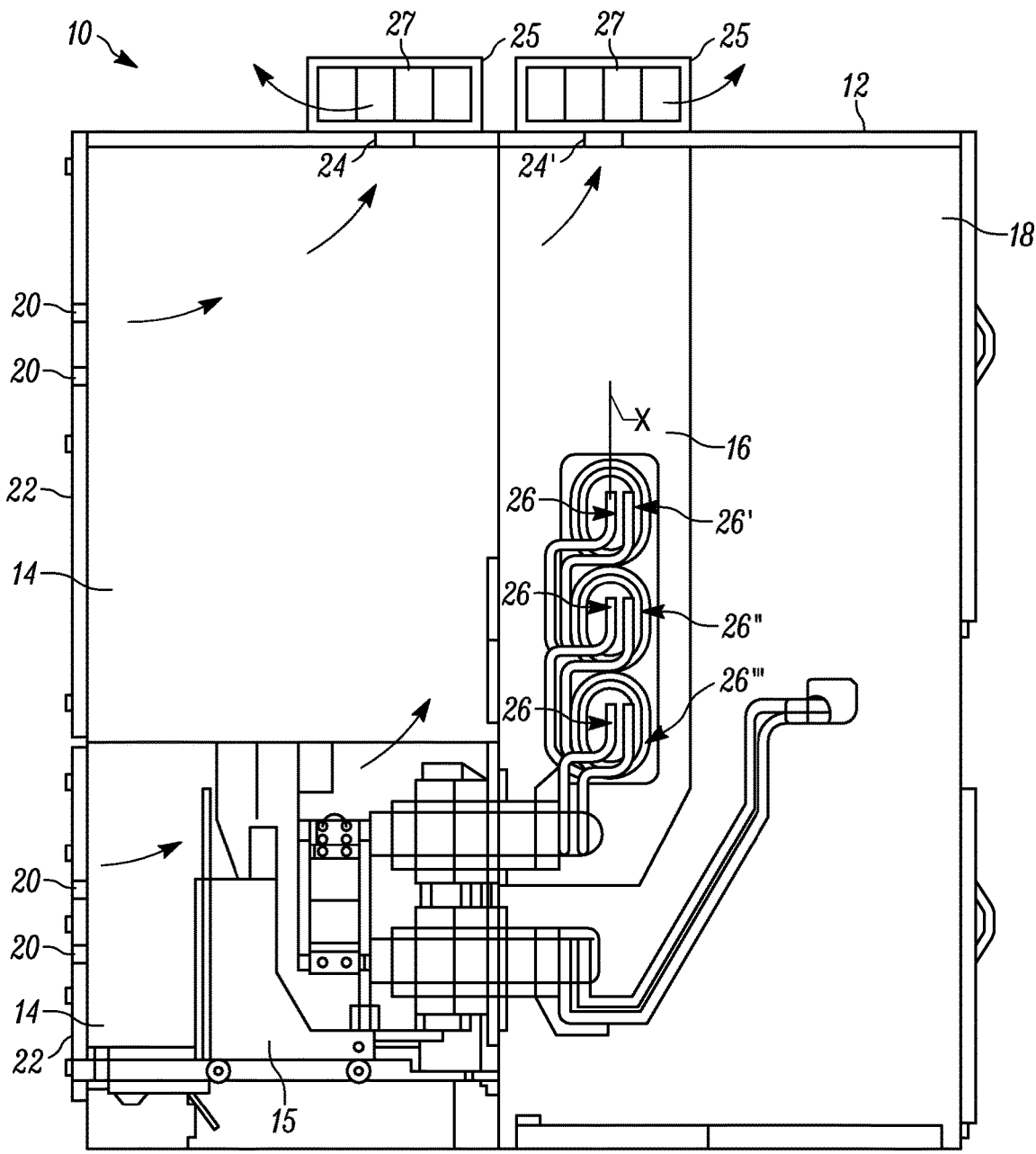
FIG. 1 is side view of a conventional switchgear showing venting of an enclosure thereof.
Figure 2:
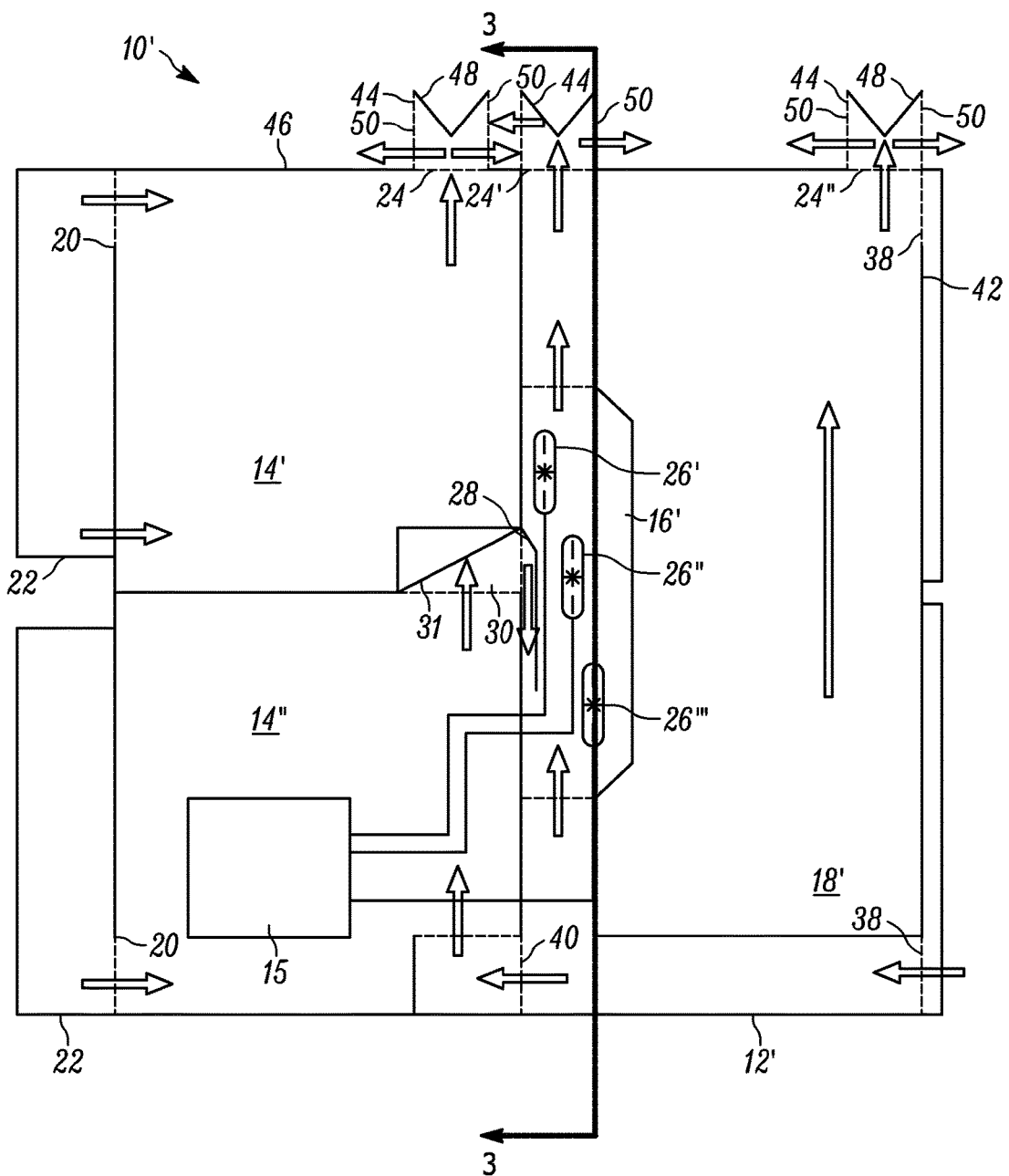
FIG. 2 is a side view of a switchgear having an enclosure for improved venting, accordance with an embodiment.

With reference to FIG. 2 a switchgear is shown, generally indicated at 10', in accordance with an example embodiment. The switchgear 10' includes an enclosure 12' that includes a first circuit breaker compartment 14' and a second circuit breaker compartment 14' disposed vertically below the first circuit breaker compartment 14'. Each compartment 14', 14" is constructed and arranged to house a circuit breaker 15 therein. The doors 22 to the circuit breaker compartments 14', 14" include openings 20 defining a door air inlet for introducing ambient air into the compartments 14', 14". The top of the first circuit breaker compartment 14' has an opening 24, defining a first air outlet, for air to exit that compartment 14'. Surfaces 28 define an air passage 30 fluidly connecting the circuit breaker compartment 14" with the adjacent main bus compartment 16'. Surfaces 28 can include a deflector 31 to deflect air from the second circuit breaker compartment 14" into the air passage 30 and into the main bus compartment 16', instead permitting air in the second circuit breaker compartment to exit through opening 24. In this way, all the air from the second circuit breaker compartment 14" is directed into the main bus compartment 16' to increase airflow in the main bus compartment 16'. The top of main bus compartment 16' has an opening 24', defining a second air outlet, for air to exit that compartment 16'. Airflow is depicted by the arrows shown in FIGS. 2 and 3.

Figure 3:
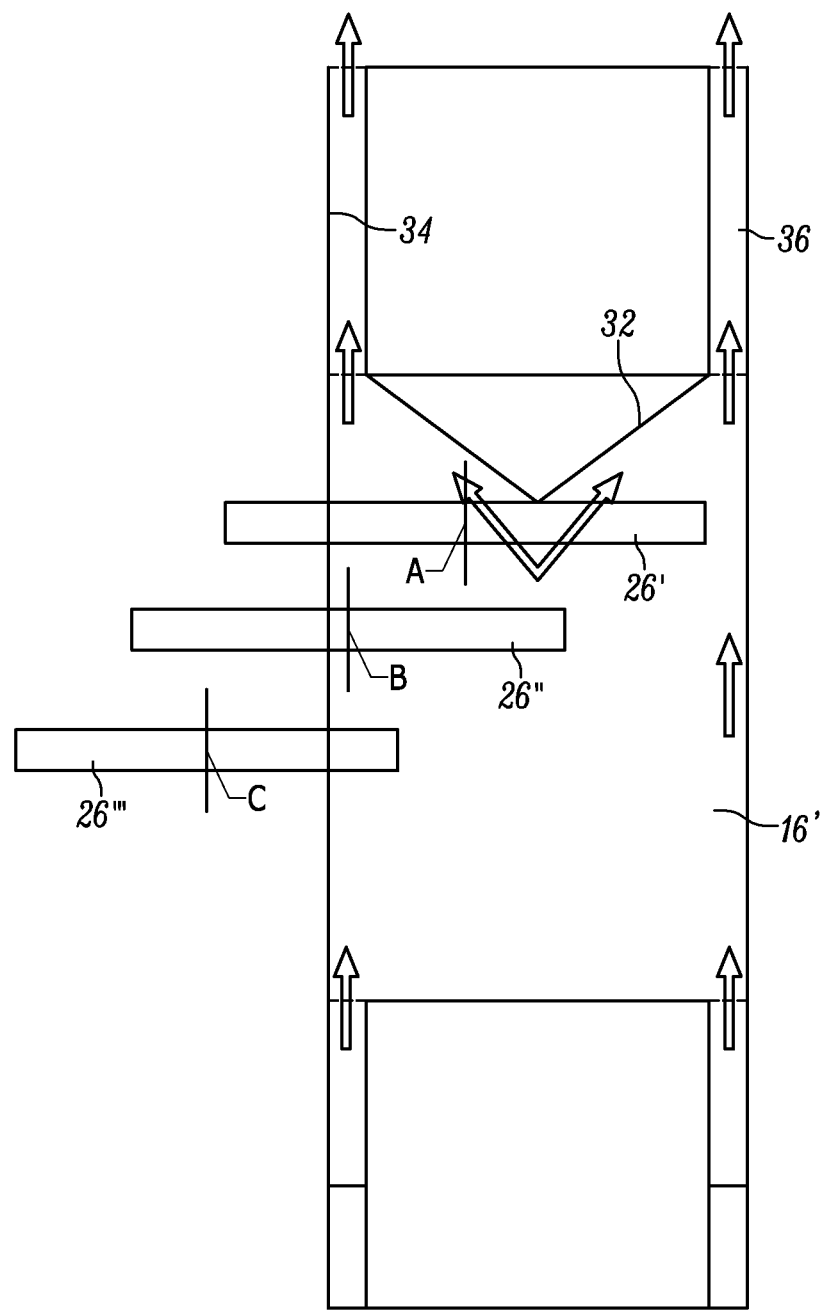
FIG. 3 is a cross-sectional view taken along the line 3-3 in FIG. 1.

As shown in FIGS. 2 and 3, first bus 26', second bus 26" and third bus 26''', each electrically connected the circuit breaker 15, are disposed in staggered, spaced, and vertically stacked relation. The second bus 26" is disposed between the buses 26' and 26". Thus, as best shown in FIG. 3, the center axis A of bus 26' is offset from the center axis B of bus 26" and a center axis C of the bus 26" is offset from the central axis A and B of the first and second buses, respectively. In this way, all buses, including second bus 26" can receive adequate airflow. In addition, the main bus compartment 16' includes a generally V-shaped deflector 32 associated with the second bus 26" to route hot air rising from bus 26" toward the sides 34, 36 of the main bus compartment 16' so as to prevent the hot air from accumulation towards the top of the main bus compartment 16'. This makes the ventilation of the second bus 26" of the embodiment more efficient.

Returning to FIG. 2, the cable compartment 18' includes at least one opening 38 defining a cable compartment air inlet for the receiving of ambient air. The cable compartment 18' is adjacent to a portion of the second circuit breaker compartment 14". The second circuit breaker compartment 14" has at least one opening 40, defining a compartment air inlet, in communication with the cable compartment 18' so air can flow from the cable compartment 18' into the second circuit breaker compartment 14". This provides even more airflow to the main bus compartment 16' via air passage 30. The cable compartment 18' also includes an opening 24" in the top thereof, defining a third air outlet, so air can exit compartment 18'. The opening 24" is located near the back wall 42 of the compartment 18' so as to ensure access for a bus duct (not shown).

A vent box 44 is mounted to the top 46 of the enclosure 12 at each exit opening 24, 24' and 24" so that air flowing through an opening enters the associated vent box 44. Each vent box 44 includes an internal V-shaped deflector 48 constructed and arranged to route the hot air generally transversely with respect a direction of the airflow exiting the openings 24, 24', 24" and through opposing exit openings 50 in the vent box 44. Since a vent box 44 is disposed over each opening 24, 24" and 24''', dust cannot enter the enclosure 12' from the top of the vent box 44.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. An enclosure for a switchgear, the enclosure comprising:
    a first circuit breaker compartment constructed and arranged to house a first circuit breaker therein, the first circuit breaker compartment having an opening therein defining a first air outlet,
    a second circuit breaker compartment constructed and arranged to house a second circuit breaker therein, the second circuit breaker compartment being adjacent to and vertically below the first circuit breaker compartment, the second circuit breaker compartment having an opening therein defining a compartment air inlet,
    a first door associated with the first circuit breaker compartment,
    a second door associated with the second circuit breaker compartment, each door having an opening therein defining a door air inlet,
    a main bus compartment adjacent to at least the second circuit breaker compartment and constructed and arranged to house circuit breaker buses therein, the main bus compartment having an opening therein defining a second air outlet,
    surfaces defining an air passage fluidly connecting the second circuit breaker compartment with the main bus compartment, and
    a cable compartment adjacent to the main bus compartment and adjacent to a portion of at least the second circuit breaker compartment, the cable compartment having an opening therein defining a third air outlet and at least one other opening therein defining a cable compartment air inlet,
    wherein to ventilate the enclosure, 1) air entering through the door air inlet of the first door can flow out of the first air outlet, 2) air entering through the door air inlet of the second door and air from the cable compartment air inlet that enters the second circuit breaker compartment via the compartment air inlet, can flow into the main bus compartment via the air passage and flow out of the second air outlet, and 3) air entering the cable compartment via the cable compartment air inlet can flow out of the third air outlet.

2. The enclosure of claim 1, further comprising a vent box disposed over each of the openings that define the first, second and third air outlets, each vent box having at least one exit opening so that air flowing into the vent box can flow out of the exit opening to atmosphere.

3. The enclosure of claim 2, wherein each vent box includes opposing exit openings and an internal V-shaped deflector constructed and arranged to route air generally transversely, with respect a direction of airflow entering the vent box, to exit through the exit openings.

4. The enclosure of claim 2, wherein each vent box is disposed over each of the openings that define the first, second and third air outlets so that dust cannot enter the enclosure from a top of each vent box.

5. The enclosure of claim 1, wherein the surfaces defining the air passage includes a deflector to direct air from the second circuit breaker compartment into the main bus compartment.

6. The enclosure of claim 1, further comprising a circuit breaker in the second circuit breaker compartment, and buses electrically connected with the circuit breaker, disposed in the main bus compartment.

7. The enclosure of claim 6, wherein the buses include first, second and third buses provided in staggered, spaced, and vertically stacked relation with the second bus disposed between the first and third buses.

8. The enclosure of claim 7, further comprising a deflector in the main bus compartment associated with the second bus and constructed and arranged to divert air rising from the second bus toward sides of the main bus compartment.

9. The enclosure of claim 7, wherein a center axis of the first bus is offset from a center axis of the second bus, and a center axis of the third bus is offset from the center axis of each of the first and second buses.

10. A switchgear comprising:
    an enclosure comprising:
        a first circuit breaker compartment constructed and arranged to house a first circuit breaker therein, the first circuit breaker compartment having an opening therein defining a first air outlet,
        a second circuit breaker compartment constructed and arranged to house a second circuit breaker therein, the second circuit breaker compartment being adjacent to and vertically below the first circuit breaker compartment, a first door associated with the first circuit breaker compartment, a second door associated with the second circuit breaker compartment, each door having an opening therein defining a door air inlet, a main bus compartment adjacent to at least the second circuit breaker compartment and constructed and arranged to house circuit breaker buses therein, the main bus compartment having an opening therein defining a second air outlet, surfaces defining an air passage fluidly connecting the second circuit breaker compartment with the main bus compartment, and a cable compartment adjacent to the main bus compartment and adjacent to a portion of at least the second circuit breaker compartment, a circuit breaker disposed in the second circuit breaker compartment and first, second and third buses provided in staggered, spaced, and vertically stacked relation disposed in the main bus compartment, the buses being electrically connected with the circuit breaker, wherein to ventilate the enclosure, 1) air entering through the door air inlet of the first door can flow out of the first air outlet, and 2) air entering through the door air inlet of the second door can flow into the main bus compartment via the air passage and flow out of the second air outlet.

11. The switchgear of claim 10, wherein the second circuit breaker compartment has an opening therein defining a compartment air inlet and wherein the cable compartment has an opening therein defining a third air outlet and at least one other opening therein defining a cable compartment air inlet so that air entering through the door air inlet of the second door and air from the cable compartment air inlet that enters the second circuit breaker compartment via the compartment air inlet, can flow into the main bus compartment via the air passage and flow out of the second air outlet, and air entering the cable compartment via the cable compartment air inlet can flow out of the third air outlet.

12. The switchgear of claim 10, further comprising a deflector in the main bus compartment associated with the second bus and constructed and arranged to divert air rising from the second bus toward sides of the main bus compartment.

13. The switchgear of claim 10, wherein a center axis of the first bus is offset from a center axis of the second bus, and a center axis of the third bus is offset from the center axis of each of the first and second buses.

14. The switchgear of claim 11, further comprising a vent box disposed over each of the openings that define the first, second and third air outlets, each vent box having at least one exit opening so that air flowing into the vent box can flow out of the exit opening to atmosphere.

15. The switchgear enclosure of claim 14, wherein each vent box includes opposing exit openings and an internal V-shaped deflector constructed and arranged to route air generally transversely, with respect a direction of airflow entering the vent box, to exit through the exit openings.

16. The switchgear of claim 14, wherein each vent box is disposed over each of the openings that define the first, second and third air outlets so that dust cannot enter the enclosure from a top of each vent box.

17. The switchgear of claim 10, wherein the surfaces defining the air passage includes a deflector to direct air from the second circuit breaker compartment into the main bus compartment.

* * * * *